June 3, 1924.
L. LYNCH
CHANNEL STRIP LAYING TOOL
Filed Sept. 4, 1923
1,496,239
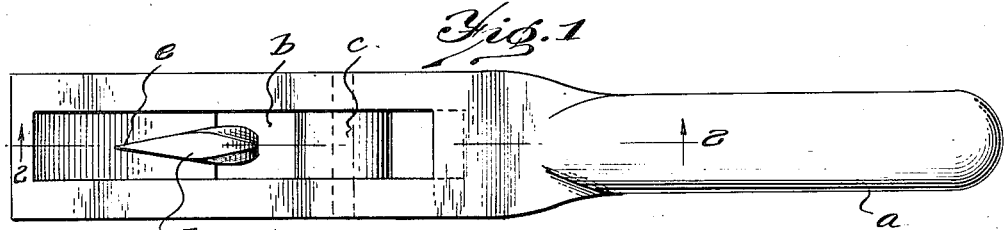
Fig. 1
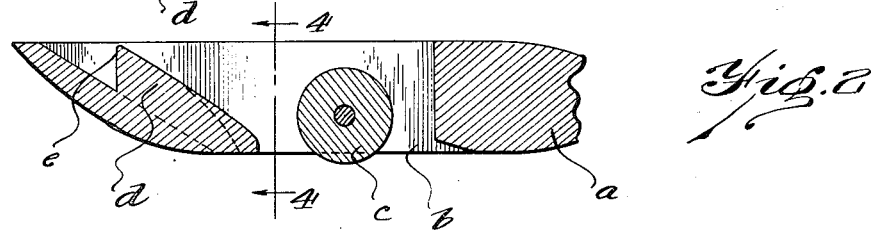
Fig. 2
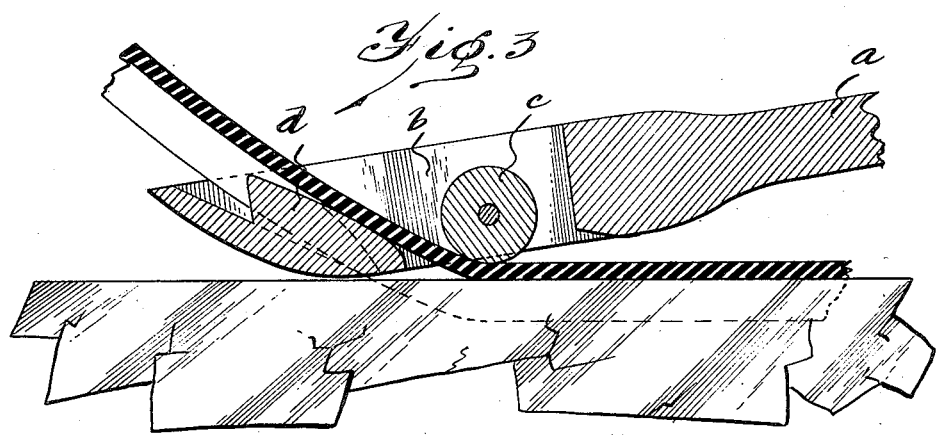
Fig. 3
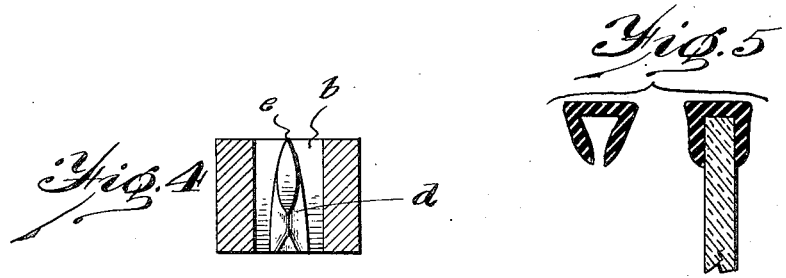
Fig. 4
Fig. 5
Inventor
Leigh Lynch.
By Stuart C Barnes Patented June 3, 1924.

1,496,239

UNITED STATES PATENT OFFICE.

LEIGH LYNCH, OF BIRMINGHAM, MICHIGAN, ASSIGNOR TO FISHER BODY CORPORATION, OF DETROIT, MICHIGAN, A CORPORATION OF NEW YORK.

CHANNEL-STRIP-LAYING TOOL.

Application filed September 4, 1923. Serial No. 660,701.

*To all whom it may concern:*

Be it known that LEIGH LYNCH, citizen of the United States, residing at Birmingham, in the county of Oakland and State of Michigan, has invented certain new and useful Improvements in Channel-Strip-Laying Tools, of which the following is a specification.

This invention relates to a tool for laying flexible channels on the edges of glass. In automobile body building, the rear window in a closed job is fitted with a channel strip of rubber before the same is sealed into the body with cement or putty. These channel strips have side walls which tend to converge so that when the channel strip is placed on the edge of the glass panel, it will cling to the panel with such tenacity as to ordinarily prevent its coming loose. The glass panels used in the rear windows do not have their edges ground off and the consequence is, they are raw and sharp. Very often the workman severely cuts himself in attempting to fit this rubber channel on this raw-edged glass. Furthermore, it takes some time to lay the rubber channel by hand along the edge of the glass. It is the object of the present invention to provide a tool to not only expedite this operation, but that will also avoid the danger of cutting one's hands.

In the drawings:

Fig. 1 is a top plan view of the tool.

Fig. 2 is a fragmentary longitudinal section of the same taken on the line 2—2 of Fig. 1.

Fig. 3 is a fragmentary sectional view showing how the rubber channel is laid upon the top edge of the glass panel by means of the tool.

Fig. 4 is a section taken on the line 4—4 of Fig. 2.

Fig. 5 is a composite view showing the cross section of the rubber channel before and after placing the same on the glass panel.

A rubber channel is shown in Fig. 5, where it will appear that the cross section shows the two sides of the channel tending towards each other. When the channel is mounted on the glass panel as shown in Fig. 5, the side walls of the channel are spread in order to encompass the glass. The result is that the channel clings very tightly to the glass and prevents its falling off. Now, in order to mount the channel upon the glass, it is of course, necessary to spread the edges of the channel. This has to be done with the fingers and when the fingers hold the channel walls spread and attempt to fit it over the glass, they are very liable to be cut by the raw edges of the glass.

In place of this way of effecting the mounting, I use the tool which is provided with a handle $a$, and a block portion provided with a slot $b$, in which is rotatably supported the roller $c$. The slot has a front inclined wall provided with an integral portion which acts as a spreader block and is designated $d$. The rear of this spreader block is wide enough to spread the channel to sufficient width as to easily straddle the glass. The front of this block is tapered or pointed so as to facilitate the mounting of the rubber channel onto the tool.

The workman takes the rubber strip, slips it down the inclined front wall of the slot, the point $e$ of the spreading block serving to spread the walls of the channel as it is slid over the block, and under the roller $c$. This position of the rubber strip is shown in Fig. 3. When the strip is started on the panel the same protrudes only slightly below the roller and the wide end of the spreading block $d$ keeps the side walls of the strip lying below the roller spread to sufficient width to easily drop over the panel. The workman simply drops this portion of the strip onto the panel. He then grasps the top of the strip behind the roller with his hand and pushes the tool forward. This lays the strip onto the edge of the glass in almost no time. In fact, it can be laid onto the glass as fast as the operator pushes the tool along the strip. The strip, of course, will guide itself onto the panel after it has once been started. The function of the tool is simply to continuously spread the side walls of the channel as the successive portions of the strip are laid upon the edge of the panel. The function of the roller is to press the strip down firmly on the edge of the panel as the same is laid over the edge.

What I claim is:

1. A tool for laying a flexible channel strip on the edge of a panel, comprising means for spreading the channel, and a handle connected with such means by which the said means may be slipped along the channel to spread successive portions of the strip as the same is laid upon the panel edge.

2. A tool for laying a flexible channel on the edge of a panel, comprising means for spreading the channel walls, means for pressing the channel strip down upon the edge, and a handle connected with the two last mentioned means by which the tool may be pushed along the strip to successively spread the same and lay it upon the panel edge.

3. A tool for laying a flexible channel strip on the edge of a panel, comprising a spreading block, and means for pressing the channel strip onto the panel edge.

4. A tool for laying a flexible channel strip on the edge of a panel, comprising a spreading block for spreading the side walls of the channel, means for pressing the channel strip onto the panel edge, and a handle connected with said two last mentioned elements by which the tool may be passed along the strip to successively spread the channel walls and to press the channel strip onto the panel edge.

5. A tool for laying a flexible channel strip on the edge of a panel, comprising a handle and a block-like member which is slotted and provided with a spreading block by which the channel walls of the channel strip may be spread and the channel strip caused to lie on the panel edge when the tool is pushed along to successively spread the channel walls.

6. A tool for laying a flexible channel strip on the edge of a panel, comprising a handle, a block-like portion connected therewith and which is slotted and provided with a spreading block adapted to engage between the channel walls of the strip to spread the same, and a roller within the slot rotatably supported and engaging the top of the channel strip to the rear of the spreading block to press the channel strip onto the panel edge as succeeding portions of the channel strip walls are spread by the spreading block when the tool is passed along the channel strip.

7. A tool for laying a flexible channel strip on the edge of a panel, comprising a block-like member provided with a slot having a spreading block at the forward end of the slot, and a roller rotatably supported at the rear of the slot, whereby a channel strip may be passed over the spreading block and under the roller to successively spread the channel walls of the strip while the roller serves to press down the channel strip onto the panel edge when the tool is moved along the strip.

8. A tool for laying a flexible channel strip on the edge of a panel, comprising a block-like member having a slot with an inclined forward wall provided with a spreading block and a roller rotatably supported in said slot to the rear of the block, whereby the channel strip can be passed over the spreading block to spread the channel walls and under the roller, said roller serving to press the strip onto the panel edge when the tool is moved along the strip.

In testimony whereof he has affixed his signature.

LEIGH LYNCH.